United States Patent [19]

Ikari et al.

[11] Patent Number: 4,633,077
[45] Date of Patent: Dec. 30, 1986

[54] PHOTOELECTRIC SWITCH WITH LIMIT SETTING MEANS TO PREVENT DISABLEMENT WHEN THE AMPLIFIER IS SATURATED

[75] Inventors: Motoo Ikari, Kyoto; Yoshiaki Kanbe, Nara; Yoshihiko Okuda, Ikoma; Yuki Yorifuji, Osaka; Hitoshi Miyashita, Hirakata; Haruhiko Momose, Hachioji, all of Japan

[73] Assignee: Matsushita Electric Works, Ltd., Osaka, Japan

[21] Appl. No.: 582,888

[22] Filed: Feb. 23, 1984

[30] Foreign Application Priority Data

Feb. 28, 1983 [JP] Japan ................... 58-32355

[51] Int. Cl.$^4$ ............................................. H01J 40/14
[52] U.S. Cl. ................... 250/214 L; 250/221; 250/214 SW
[58] Field of Search ............ 250/214 L, 214 SW, 221, 250/222.1, 201 AF; 356/1, 4; 354/403, 425

[56] References Cited

U.S. PATENT DOCUMENTS

| | | | |
|---|---|---|---|
| 3,736,057 | 5/1973 | Harvey | 250/201 |
| 4,051,365 | 9/1977 | Fukuyama et al. | 250/222.1 |
| 4,251,144 | 2/1981 | Matsuda et al. | 354/25 |
| 4,445,029 | 4/1984 | Nagaoka | 250/201 |
| 4,527,892 | 7/1985 | Yamane et al. | 356/1 |

Primary Examiner—David C. Nelms
Assistant Examiner—James G. Gatto
Attorney, Agent, or Firm—Burns, Doane, Swecker & Mathis

[57] ABSTRACT

There is provided a photoelectric switch in which a beam reflected by an object to be detected is received in a trigonometric manner so that any failure in the distance measurement of the object can be prevented with employment of ordinary amplification circuit for received-light signals without enlarging the figure of the dynamic range of the circuit. In the switch, a circuit for comparing the ratio of the received-light signals to a predetermined operational level includes means for setting the nearest limit point for a set range of a detecting area to be farther than an intersection of the projected light beam with a line connecting centers of light-receiving lens and received-light detecting element so that the detection of the object can be made even when the dynamic range of the amplification circuit is saturated, whereby the presence of the object in the detecting area can be always discriminated even upon the dynamic range saturation of the amplification circuit.

9 Claims, 18 Drawing Figures

Fig. 13

PHOTOELECTRIC SWITCH WITH LIMIT SETTING MEANS TO PREVENT DISABLEMENT WHEN THE AMPLIFIER IS SATURATED

This invention relates to photoelectric switches and, more specifically, to a reflected-light receiving type photoelectric switch which can detect the presence or absence of an object to be detected within a preset detecting area with a high accuracy for optimumly controlling an associated actuation circuit.

Figure 14:
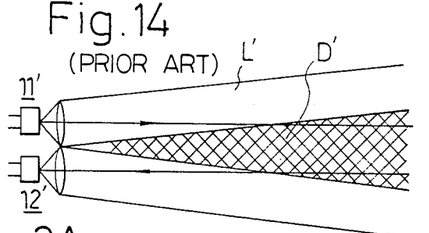
FIG. 14 shows an example of a known photoelectric switch.

One of the known photoelectric switches of the type referred to is disclosed in U.S. Pat. No. 4,051,365 to Toshifumi Fukuyama et al, as shown in FIG. 14. This photoelectric switch includes a light emitting section 11' light L' and a reflected light receiving section 12'. When an object to be detected is present within such a detecting area D' defined by both sections and shown as cross-hatched, an electrical light detecting element in the light receiving section 12' generates a signal current above a predetermined level so that an electric equipment operatively connected to the photoelectric switch is properly controlled through a proper signal processing circuit and associated actuation circuit. With this arrangement, however, the light receiving section is operated depending on the amount of light reflected from the object, and there may arise such a problem that, for example, when a matter of high reflectance exists or comes behind the detecting area, the amount of light received by the receiving section increases and the electric equipment is thereby caused to be controlled even without the presence of any object to be detected within the area.

Further, while not relating to the so-called photoelectric switch, U.S. Pat. No. 3,443,502 to D. M. Harvey and Japanese Patent Appln. Laid-Open Publication No. 119006/80 of Takabayashi et al show examples of known distance measuring systems. In the former, there is shown a distance measuring system applied to an automatic focusing camera in which a beam emitted from a light source and reflected by a subject to be photographed is led to a light-receiving lens arranged for performing a trigonometric distance measurement and to a pair of photocells disposed behind the lens to generate a signal current or currents from one or both of the photocells according to the incident angle of the beam with respect to the lens. The photocells are connected with a pair of solenoids through a pair of amplification circuits and switches, and a lens mechanism is operatively coupled to the solenoids to be thereby controlled to vary its focus such that one or both of the solenoids energized by the signal current or currents according to the beam incident angle will adjust the lens focus. Since the condensed light spot on the photocells is relatively large, however, the system of this patent may not be directly adaptable to the detection of an object entering a predetermined detecting area with a high accuracy, due to which the object measuring distance of the system being too long, while the system may be used to operate the lens mechanism with a relatively low accuracy.

In a distance measuring system disclosed in the latter Takabayashi et al Japanese Application, on the other hand, a beam reflected by an object to be detected is received through a light-receiving lens by a position detecting element disposed behind the lens to generate two different signal currents according to the position of a condensed light spot on the element so as to perform a trigonometric measurement similarly to the Harvey U.S. patent. The position detecting element is connected with an arithmetic circuit for calculating the two signals so that a correction circuit is operated according to the calculated value. According to this Takahashi et al application, the arithmetic circuit amplifies the two signals and, the dynamic range of the ordinary amplification circuit, which is in the order of $10^2$ satisfies the purpose because the detection area is restricted. However, the so-called photoelectric switch is specifically used to detect an object being transported by a belt conveyor or the like, and the detection area must be set as large as to be, for example, about 30 to 300 mm. In addition a dynamic range on the order of at least $10^1$ is necessary for processing the change in the distance of the object and another dynamic range on the order of at least $10^1$ is required for processing the change in the reflectance of the object so that, unless the amplification circuit has a dynamic range on the order of $10^3$ or more, the dynamic range will be saturated and thus the measured distance is erroneous. Further, there may arise another problem that, when the dynamic range of the amplification circuit is widened to prevent the saturation, this makes the circuit highly complex and expensive.

A primary object of the present invention is, therefore, to provide a photoelectric switch which is made free of erroneous detection even when the dynamic range of the amplification circuit for the received-light signals is saturated without being increased in order of magnitude by means of setting the nearest limit point of a set range of the detecting area to be farther than an intersection of a projected light beam with a line connecting the centers of a light-receiving lens and of a position detecting element within a circuit for comparing calculated values of an arithmetic circuit processing the signals from the amplification circuit with a predetermined value.

Other objects and advantages of the present invention shall become clear from the following description of the invention detailed with reference to accompanying drawings, in which:

While the present invention shall now be described with reference to certain preferred embodiments shown in the drawings, it should be understood that the intention is not to limit the invention only to those embodiments disclosed but rather to cover all alterations, modifications and equivalent arrangements possible within the scope of the appended claims.

Figure 1:
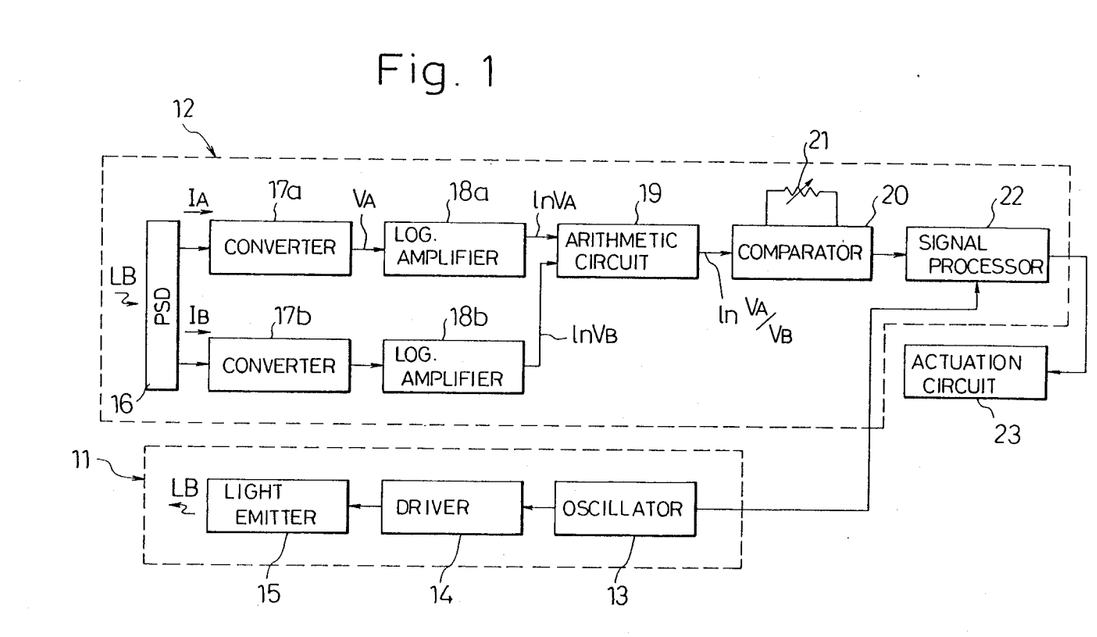
FIG. 1 is a block circuit diagram of an embodiment of the photoelectric switch according to the present invention.

Referring to FIG. 1, the photoelectric switch generally comprises a light emitting section 11 and a reflected light receiving section 12. In the light emitting section 11, a light beam LB is projected from such a light emitting element 15 as a light emitting diode or a laser diode, which beam is pulse-modulated by a drive circuit 14 connected to an oscillation circuit 13.

Figure 2:
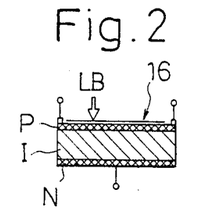
FIG. 2 is a model of a one-dimensional position detecting element employed in FIG. 1.
Figure 3A:
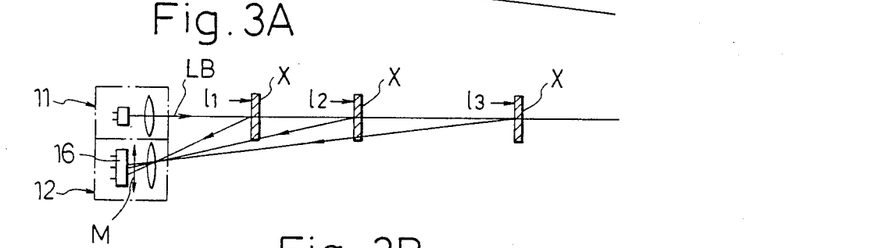
FIGS. 3A and 3B are explanatory views for the light receiving state with respect to the position of an object to be detected.
Figure 3B:
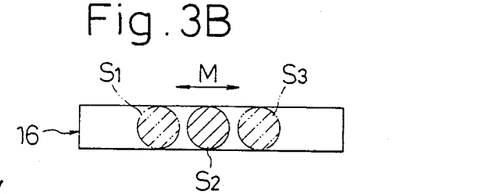

The light receiving section 12 includes a one-dimensional position sensing element (hereinafter, referred to as PSD) 16 which receives the light beam LB reflected by an object X to be detected. The reflected beam is condensed to be a spot S on the PSD 16 by a lens receiving the light to perform a trigonometric measurement of distance. The PSD 16, as shown in FIG. 2, is a semiconductor which comprises a surface P-layer, rear-surface N-layer and intermediate I-layer, and generates current signals $I_A$ and $I_B$ responsive to the amount of light received. The signal $I_A$ increases proportionally to an amount in which the spot S shifts in one direction on the PSD 16, whereas the signal $I_B$ decreases proportionally to the shifting amount. Now, provided that the object X shifts along the light beam LB, then the condensed light spot of the reflected light from the object X at a position $l_1$, $l_2$ or $l_3$ of varying distance from the light emitting section 11 as shown in FIG. 3A is formed on the PSD 16 as the spot $S_1$, $S_2$ or $S_3$ depending on the position, as shown in FIG. 3B, so that the PSD 16 generates the signal current $I_A$ or $I_B$ according to the displacement of the spot in either direction of arrows M and provides it to an amplification circuit. The position sensing element 16 may be effectively replaced by any element other than the PSD so long as it generates two varying outputs according to the position of the condensed light spot.

Figure 4:
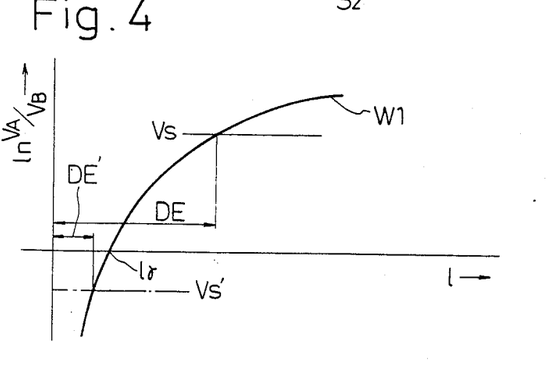
FIG. 4 is a diagram showing a relation between the distance to the object and the output of a subtraction circuit in FIG. 1.
Figure 6:
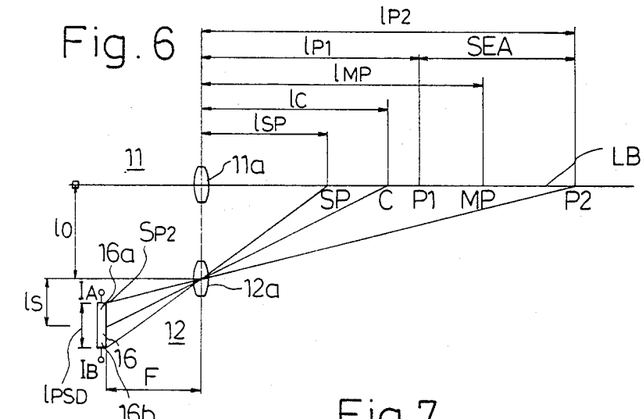
FIG. 6 is an explanatory view showing a relation between the position of the object and the position detecting element in FIG. 1.

The amplification circuit comprises converters 17a and 17b and logarithmic amplifiers 18a and 18b. The signal currents $I_A$ and $I_B$ are amplified and converted into signal voltages $V_A$ and $V_B$ in the converters 17a and 17b, and then amplified in the logarithmic amplifiers 18a and 18b to generate outputs $\ln V_A$ and $\ln V_B$, respectively. The outputs $\ln V_A$ and $\ln V_B$ are then provided to such an arithmetic circuit 19 as a subtraction circuit where the ratio between the outputs $\ln V_A$ and $\ln V_B$ is calculated and such a signal $\ln V_A/V_B$ as shown by a curve W1 in FIG. 4 is sent from the circuit 19 to a comparison circuit 20. The latter circuit 20 is provided with a volume control 21 for setting the object detecting area and compares the operational level set by the volume control 21 with the output $\ln V_A/V_B$ from the arithmetic circuit 19 so that, when the signal $\ln V_A/V_B$ is lower than the set operational level, an H level signal will be generated. In other words, the desired detecting area can be set within the settable range SEA as shown in FIG. 6 by adjusting the volume 21. When the area is set to be up to, for example, a medial point MP on the beam LB as in FIG. 6, the object which is present anywhere within a distance range up to 1 MP can be detected.

Figure 5A:
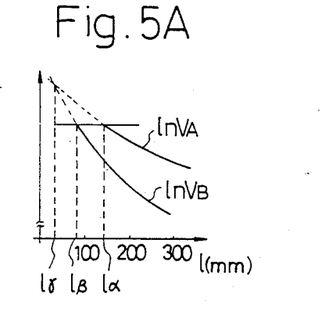
FIG. 5A is a diagram showing a relation between the distance to the object and the outputs of a pair of amplification circuits in FIG. 1 for explaining how a distance measurement error occurs.
Figure 5B:
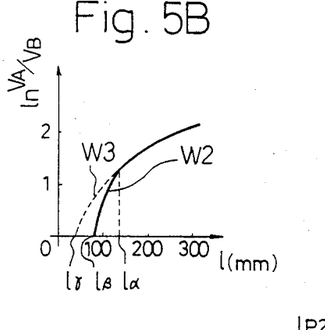
FIG. 5B is a diagram showing a relation between the distance to the object and the output of the subtraction circuit for explaining how the distance measurement error occurs.

Each of the amplification circuits 17a, 18a and 17b, 18b for the signals $I_A$ and $I_B$ usually has a dynamic range in the order of magnitude of $10^2$ and, when, for example, an object having a high reflectance approaches the detecting area, there is a high possibility that the dynamic range of the amplification circuits is saturated. Assuming that, as shown in FIG. 5A, the dynamic range of the amplification circuit 17b and 18b is saturated when the object is at a position $l_\beta$ while the dynamic range of the other amplification circuit 17a and 18a is saturated when the object is at a position $l_\alpha$, the output $\ln V_A/V_B$ of the arithmetic circuit 19 will not correspond to the actual distance of the object in the range between the positions $l_\beta$ and $l_{60}$ and a distance measurement error occurs. In a range less than the distance $l_\beta$, the output $\ln V_A/V_B$ is zero since the signal ratio $I_A/I_B$ is 1, and thereby the distance measurement is disabled. There are illustrated in FIG. 5B curves showing the relation between the output $\ln V_A/V_B$ of the arithmetic circuit 19 and the distance of the object, wherein a solid line curve W2 represents the case when the dynamic range of the respective amplification circuits 17a, 18a and 17b, 18b is saturated and a dotted-line curve W3 represents the case when the dynamic range is not saturated.

Referring again to FIG. 4, an operational level $V_S'$ is set below zero as depicted with a broken line so that the detecting area of the comparison circuit 20 will not include zero. If, in this case, an object of a high reflectance is present within the detecting area DE' and the dynamic range of both of the amplification circuits 17a, 18a and 17b, 18b is saturated, the output $\ln V_A/V_B$ of the arithmetic circuit 19 becomes zero. At this time, the comparison circuit 20 generates an L level signal, and an actuation circuit 23 connected through a signal processing circuit 22 to the comparison circuit 20 will not be energized. For this reason, there occurs such a problem that, though the object is present within the detecting area DE', the object is erroneously detected as if it were located at a position $l_\gamma$ and thus the equipment to be operated by the actuation circuit 23 will not smoothly operate. The signal processing circuit 22 also receives a synchronizing signal from the oscillation circuit 13 of the light emitting section 11. The circuit 22 functions to sample the output of the comparison circuit 20 in synchronism with the light emitting timing of the beam LB and reliably decide whether or not the object is present within the detecting area.

According to a remarkable feature of the present invention, any distance measurement error can be prevented from occurring. Turning, in particular, to FIGS. 1 and 6, in the present invention, the nearest limit point P1 of the settable range for the detecting area is set to be farther than an intersection point C of the emitted light beam LB with a line connecting the centers of the light-receiving lens 12a and of the PSD 16. That is, when the range in which the farthest limit point MP of the detecting area DE can be set is between the points P1 and P2, then a distance $l_{P1}$ from the light emitting section 11 to the nearest limit point P1 is made to be equal to or larger than a distance $l_c$ of the middle intersection point C of the detecting area determined by the light receiving lens 12a and PSD 16, i.e., to be $l_{P1} \geq l_c$. In practice, this can be realized by means of, for example, a fixed resistor or the like attached to as a variable resistor provided to the comparison circuit 20.

Now, if an object of high reflectance lies in a detecting area of which the distance $l_{MP}$ to the farthest limit point MP is set to be between the distances $l_{P1}$ and $l_{P2}$ and the PSD 16 receives a strong light reflected by the object through the lens 12a, then the signals $I_A$ and $I_B$ generated by the PSD 16 as has been described will be enlarged to have the dynamic ranges of the amplification circuits saturated. While this causes the output $\ln V_A/V_B$ of the arithmetic circuit 19 to become zero, disabling the distance measurement, the comparison circuit 20 controls the settable range SEA so as to be as shown by the equation $l_{P1} \geq l_c$, that is, the circuit is provided with a sort of range-setting control means. When considered from another view point, the operational level $V_s$ of the comparison circuit 20 (see FIG. 4) is kept to be always above zero, so that this state will be always judged to be the presence of the object X in the detecting area, and thus the actuation circuit 23 is energized. In other words, with such a featured arrangement of the present invention, the saturated state of the amplification circuits 17a, 18a and 17b, 18b is always judged to be the presence of the object in the detecting area by which the actuation circuit 23 is to be energized. That is, the device according to the present invention is provided with a sort of fail safe function.

Figure 7:
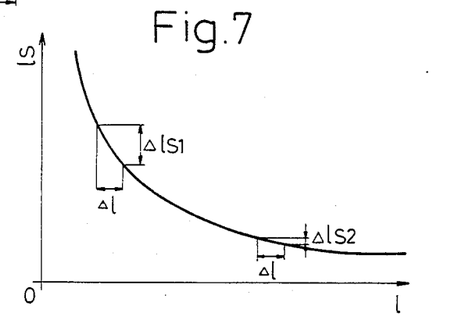
FIG. 7 shows diagrammatically a relation between the distance of the object and the central position of condensed light spot on the element in FIG. 1.
Figure 8:
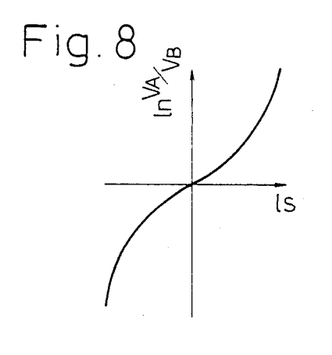
FIG. 8 is a graph showing a relation between the central position of the spot and the output of the subtraction circuit in FIG. 1.

In the photoelectric switch system which receives the reflected light by triangulation as shown in FIG. 6, the distance $l_s$ between the center of the light-receiving lens 12a and the center of the condensed light spot S on the PSD 16 in the direction vertical to the emitted light beam LB satisfies an equation $l_s = l_0 \times F/l$, wherein F represents a horizontal distance between the lens 12a and PSD 16, $l_0$ represents a vertical distance between the centers of the light-emitting lens 11a and light-receiving lens 12a and $l$ denotes a horizontal distance between the lens 11a and the object. Accordingly, as the distance $l$ increases, variation in $l_s$ with respect to distance variation $\Delta l$ decreases from $\Delta l_{s1}$ to $\Delta l_{s2}$ as seen in FIG. 7. The relation between the distance $l_s$ and the ratio $I_A/I_B$ of the output signals from the PSD 16 is represented by $\ln I_A/I_B = l_n (l_{PSD}/l_s - 1)$, wherein $l_{PSD}$ is the length of the PSD 16. As the $l_s$ variation thus decreases from $\Delta l_{s1}$ to $\Delta l_{s2}$, variation in the ratio $I_A/I_B$ decreases and the distance measurement decreases in accuracy, but the $I_A/I_B$ variation upon an incident of the received light at an end portion of the PSD 16 becomes abrupt as shown in the curve of FIG. 8, and such accuracy decrease can be prevented by effectively utilizing this abrupt portion of the curve.

Referring more specifically to FIG. 6, when the object X is present at the farthest limit point P2 of the settable range for the detecting area, the arrangement is made so that a condensed-light spot $S_{P2}$ of the reflected light beam $R_{P2}$ from this object will be positioned at an end portion 16a of the PSD 16. In this case, the spot $S_{P2}$ is illustrated as formed at the end edge of the PSD in FIG. 6, but it should be readily appreciated by those skilled in the art that, since the spot has practically a certain size, the center of the spot is positioned slightly inside the end edge. That is, the arrangement is made so that the center of the PSD 16 is positioned on the line connecting the nearest limit point P1 of the range SEA and the center of the light-receiving lens 12a and the end portion 16a of the PSD 16 is on the line connecting the farthest limit point P2 of the range SEA and the center of the lens 12a.

With this arrangement, the length $l_{PSD}$ of the PSD 16 is determined and a line connecting the other end portion 16b of the PSD 16 and the center of the lens 12a intersects the beam LB from the light emitting section 11 at a theoretical nearest limit point SP of the detecting area DE. Accordingly, if the distance $l$ of the object is shorter than a distance $l_{SP}$ of the nearest limit point SP, then the spot S is not present on the PSD 16 and the range of this distance $l_{SP}$ will be a non-detectable zone. Here, the distance $l_{SP}$ of the nearest limit point SP is represented by $l_{P1} \times l_c/2l_{P1} - l_c$, but it is necessary to have the zone closer than the nearest limit point SP included in the detection area to eliminate such non-detectable zone in practice. For this purpose, the nearest limit point must be more preferably set, for the reason that, when the condensed light spot S is properly adjusted to have a larger size so that the center of the spot will not be positioned on the PSD 16 but the spot will be partly incident thereon, the non-detectable zone may be removed but an excessive enlargement of the spot by defocusing the light will result in a deterioration of sensitivity due to a larger influence of the reflectional fluctuation on the condensed light spot.

Our tests have shown that the nearest limit point SP (of distance $l_{SP}$) should be determined to satisfy an equation $l_{SP} \leq \frac{2}{3} l_c$. On the other hand, because the point SP is also given by the equation $l_{SP} = l_{P2} \times l_c / 2l_{P2} - l_c$, the arrangement should be made to satisfy an equation $l_{P2} \geq 2l_c$. In addition, the distance $l_o$ between the light emitting and receiving sections must be considered, and the distances $l_{P1}$, $l_{MP}$ and $l_{P2}$ and the size of the respective components of the switch is determined empirically from a view point of their easy handling. According to our tests, however, it is found that the distance $l_o$ and $l_c$ should preferably satisfy the equation $l_c/l_o \leq 20$.

Figure 9A:
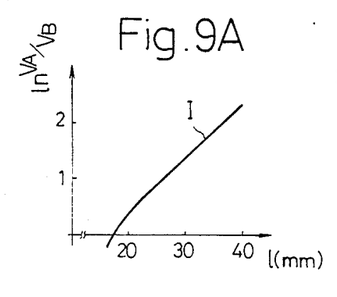
FIGS. 9A and 9B and 9C diagrammatically show relations between the distance to the object and the calculated output of the arithmetic circuit in FIG. 1 under different conditions.
Figure 9B:
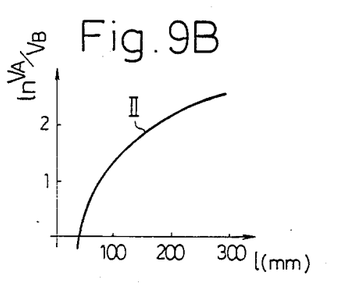
Figure 9C:
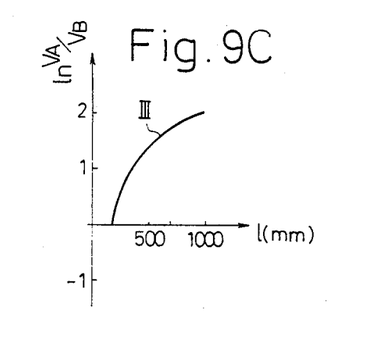

The following table shows practical examples I, II and III of the arrangement when the PSD 16 has a length of 3 mm and the above requirements are satisfied. Relations between the distance $l$ and output $\ln V_A/V_B$ in these examples are as shown in FIGS. 9A to 9C. In the table, f is the focal length of the lens 12a and d is the diameter thereof.

TABLE

| | Light-Receiving Lens | | | | | SEA | | | |
|---|---|---|---|---|---|---|---|---|---|
| | $l_o$ (mm) | F (mm) | $l_c$ (mm) | f (mm) | d (mm) | $l_{P1}-l_{P2}$ (mm) | $l_c/l_o$ | $l_{P2}/l_c$ | $l_c$ & $l_{P1}$ |
| I: | 6.3 | 7.286 | 17.5 | 6.0 | 5.5 | 20–40 | 2.78 | 2.29 | $l_c < l_{P1}$ |
| II: | 7.5 | 8.768 | 40.0 | 8.4 | 7.7 | 40–300 | 5.33 | 7.50 | $l_c = l_{P1}$ |

TABLE-continued

| | Light-Receiving Lens | | | | | SEA | | | |
|---|---|---|---|---|---|---|---|---|---|
| | $l_o$ (mm) | F (mm) | $l_c$ (mm) | f (mm) | d (mm) | $l_{P1}-l_{p2}$ (mm) | $l_c/l_o$ | $l_{p2}/l_c$ | $l_c$ & $l_{P1}$ |
| III: | 13.0 | 18.33 | 170.0 | 18.0 | 14.5 | 170–700 | 13.1 | 4.12 | $l_c = l_{P1}$ |

Figure 10:
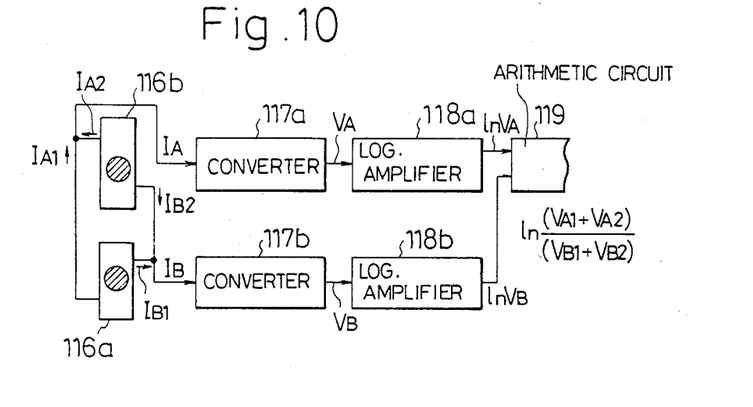
FIG. 10 is fragmentary block circuit diagram of another embodiment of the photoelectric switch according to the present invention.
Figure 11:
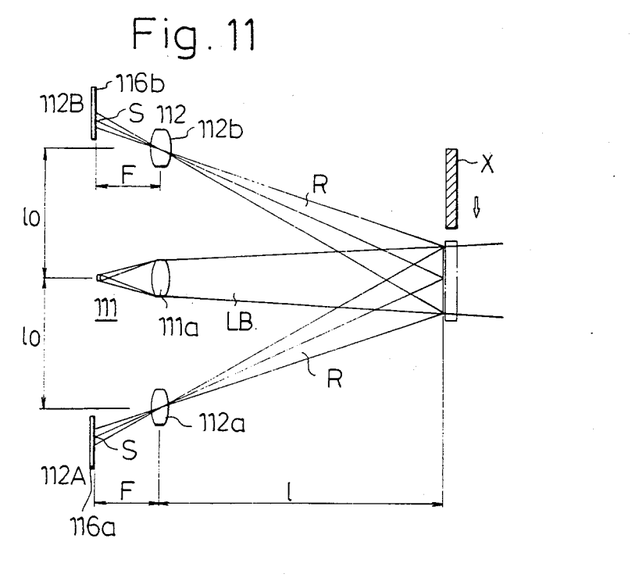
FIG. 11 is an explanatory view showing a relation between the position of the object and position detecting elements.

FIGS. 10 and 11 show another embodiment of the present invention, wherein constituent components similar to those in the first embodiment disclosed with reference to FIGS. 1 to 9 are denoted by the same numeral but as added by 100. In the present embodiment, a pair of light receiving sections 112A and 112B are arranged as spaced equally by the distance $l_o$ from a common light emitting section 111 to be symmetrical thereto. Position detecting elements 116a and 116b in the light receiving sections 112A and 112B may comprise phototransistors, photodiodes, solar cells or cadmium cells arranged in a row, in place of the PSD. These elements (hereinafter, referred to simply as PSD) 116a and 116b generate two received-light signals when subjected to the reflected light, a sum $I_A$ of generated signals $I_{A1}$ and $I_{A2}$ as well as a sum $I_B$ of the signals $I_{B1}$ and $I_{B2}$ are provided to amplification circuits 117a, 118a and 117b, 118b, respectively, to be converted into voltages and logarithmically amplified substantially in the same manner as in the first embodiment of FIG. 1, respectively as outputs $\ln V_A$ and $\ln V_B$ of the amplification circuits. An arithmetic circuit 119 such as a subtraction circuit receives the signals $\ln V_A$ and $\ln V_B$ and calculates $\ln(V_{A1}+V_{A2})/(V_{B1}+V_{B2})$ to detect the distance l of the object substantially in the same manner as in the first embodiment, whereby the presence or absence of the object within the settable range SEA is judged. In the event where a single light receiving element is used and only part of the object enters the detecting area, the condensed light spot becomes remarkably small and is formed on the PSD substantially at the same position as that of a short distanced object. Accordingly, the light receiving section is likely to be caused to erroneously perform the detection and operation but, in the present embodiment, as the two light receiving sections are symmetrically arranged so that, even when such erroneous detection occurs in one of the two light receiving sections, another spot is formed on the PSD of the other light receiving section at a position opposite to that in said one light receiving section, that is, at the position in the event when a far distance object is detected, the signals from both sections are cancelled with each other and the problem occurring in the case of the single light receiving section can be effectively avoided.

Figure 12:
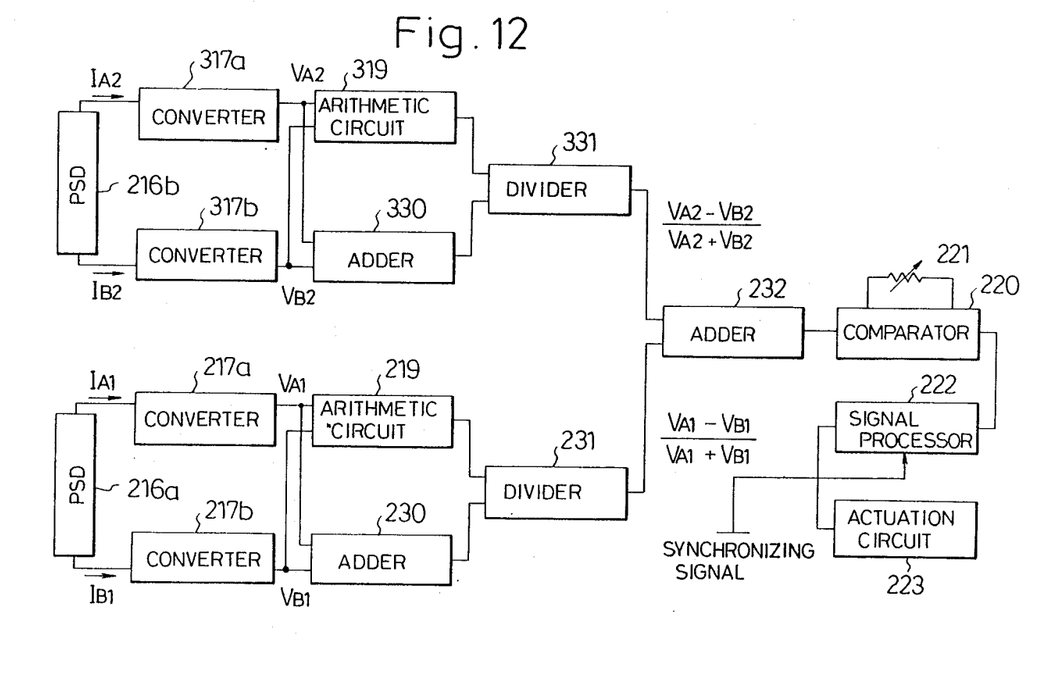
FIGS. 12 and 13 show in block circuit other embodiments of the present invention.

FIG. 12 shows still another embodiment of the invention, wherein components similar to those in the embodiments of FIGS. 1 to 10 are denoted by the same numeral but as added by 200 or 300. In the present embodiment, outputs $V_{A1}$, $V_{B1}$ and $V_{A2}$, $V_{B2}$ of amplification circuits comprising at least convertors 217a, 217b and 317a, 317b are not only subtracted but are also added in adder circuits 230 and 330 and further divided in divider circuits 231 and 331 to obtain outputs $V_{A1}-V_{B1}/V_{A1}+V_{B1}$ and $V_{A2}-V_{B2}/V_{A2}+V_{B2}$, respectively. These two output signals are provided to an adder circuit 232 and thereafter to a comparison circuit 220. The added result is processed by the comparison circuit 220 and subsequent circuits, in a similar manner to the foregoing embodiments. That is, in the present embodiment, $\frac{1}{2}[(V_{A1}-V_{B1}/V_{A1}+V_{B1})+(V_{A2}-V_{B2}/V_{A2}+V_{B2})]$ is calculated to discriminate the position of the object. In this case, so long as the displacement of the condensed light spot is smaller than the length $l_{PSD}$ of the PSD itself, a high detection characteristic can be obtained and the function of the embodiment of FIGS. 10 and 11 can be further improved.

Figure 13:
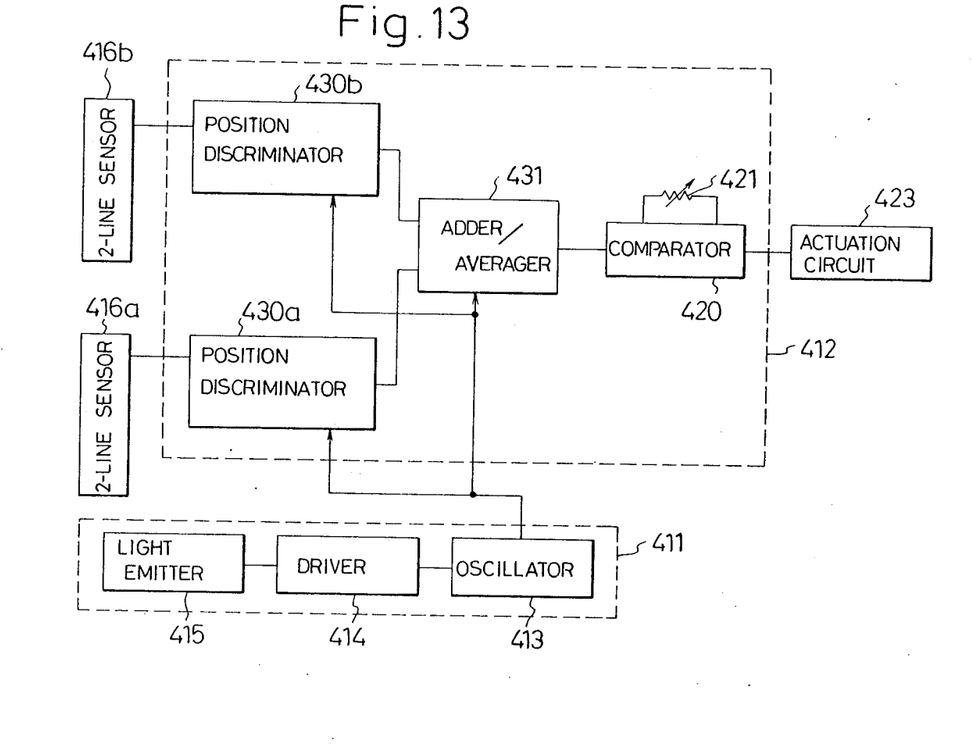

There is shown in FIG. 13 a further embodiment wherein constituent components similar to those in the embodiment of FIGS. 1 to 9 are denoted by the same numeral but as added by 400. In the present embodiment, a pair of position detecting element comprises two-line sensors 416a and 416b respectively comprising a plurality of such light receiving elements as photodiodes arranged in rows. A synchronizing signal from an oscillation circuit 413 of a light emitting section 411 is supplied to spot-position discriminators 430a and 430b connected to the respective sensors 416a and 416b and to an adder/averager 431 which receives the two outputs of the both discriminators 430a and 430b. When the sensors 416a and 416b comprise respectively a so-called CCD image sensor, the discriminators 430a and 430b discriminate a particular one of the light receiving elements which has received the condensed light spot, whereby the calculation for obtaining the ratio between the signals of received light becomes unnecessary. In the adder/averager 431, on the other hand, two position signals from the discriminators 430a and 430b are added and averaged so that a position signal of an abnormally moving object, for example, in parallel to the axes of the light emitting and receiving sections can be subjected to a proper correction so that the embodiment of FIGS. 10 and 11 can be remarkably improved in its operation. The signal processing in a comparison circuit 420 and subsequent circuits is done in the similar manner to the foregoing embodiments.

It should be appreciated that such range-setting control means as used in the embodiment of FIG. 1 can be provided to the comparison circuit in all the embodiments of FIGS. 10, 12 and 13.

According to the present invention as has been described, the trigonometric distance measurement which has not been applied to conventionally employed photoelectric switches for detecting the object being moved by, for example, a belt conveyor and the like and thereby driving the subsequent actuation circuit is made effectively applicable to such detection with the unique arrangement disclosed. As a result, distance measurement of the object no longer becomes impossible, the object can be detected with high accuracy and intended normal and reliable operation of any equipment to be actuated by the photoelectric switch is assured.

What is claimed as our invention is:

1. A photoelectric switch comprising means including a light source for emitting a light beam, means including a lens for receiving said beam after reflection by an object to be detected in a manner which provides trigonometric measurement of distance to said object, a position detecing element on which said reflected and received beam is incident as a condensed spot for generating two different received-light signals, means for amplifying said two signals and for discriminating whether or not said object is present in a detecting area, and limit setting means which, when the dynamic range of said amplifying means is saturated, sets a predetermined operational level greater than zero with which said signals are to be compared, to thereby prevent said distance measurement from being disabled depending on a position of the object.

2. A switch according to claim 1, wherein said detecting element is positioned relative to said receiving lens so as to satisfy an equation $l_{p1} \geq l_c$ in which $l_{P1}$ is a distance from said lens to the nearest point of a settable range for detecting said object and $l_c$ is a distance from said lens to a point C at which a line connecting the centers of said lens and said position detecting element intersects said light beam.

3. A switch according to claim 1, wherein a pair of said light receiving means are arranged on opposite sides of said light emitting means in a symmetrical relation thereto.

4. A switch according to claim 3, wherein said position detecting element of said light receiving means comprises a pair of light receiving elements.

5. A switch according to claim 3, wherein said position detecting element of said light receiving means comprises a one-dimensional position detecting element.

6. A switch according to claim 3, wherein said discriminating means comprises means for amplifying said two received-light signals, and said discriminating means calculates $\frac{1}{2}[(V_{A1}-V_{B1}/V_{A1}+V_{B1})+(V_{A2}-V_{B2}/V_{A2}+V_{B2})]$ in which $V_{A1}$, $V_{B1}$ and $V_{A2}$, $V_{B2}$ are outputs obtained by amplifying said signals from said two position detecting elements.

7. A switch according to claim 3, wherein said discriminating means includes means for logarithmically amplifying said received-light signals and calculates $\ln(V_{A1}+V_{A2})/(V_{B1}+V_{B2})$ in which $V_{A1}$, $V_{B1}$ and $V_{A2}$, $V_{B2}$ are outputs obtained by logarithmically amplifying the signals.

8. A switch according to claim 3, wherein said position detecting element of each of said light receiving means is an image sensor.

9. A photoelectric switch comprising means including a light source for emitting a beam of light, a pair of means each including a lens for receiving said light beam after reflection by an object to be detected in a manner which provides trigonometric measurement of distance to said object, and a position detecting element on which said reflected and received light is incident as a condensed spot for generating two different received-light signals, means for discriminating whether or not said object is present in a detecting area on the basis of said signals from said pair of signal generating means, and limit setting means which when the dynamic range of said amplifying means is saturated, sets a predetermined operational level greater than zero with which said signals are to be compared, to thereby prevent said distance measurement from being disabled depending on a position of the object.

* * * * *